United States Patent [19]

Horkan et al.

[11] Patent Number: 5,244,804
[45] Date of Patent: Sep. 14, 1993

[54] APPARATUS FOR CO-COMPOSTING MUNICIPAL REFUSE

[75] Inventors: Michael T. Horkan; Richard T. Casey, both of Portage, Wis.

[73] Assignee: City of Portage, Portage, Wis.

[21] Appl. No.: 143,623

[22] Filed: Jan. 13, 1988

[51] Int. Cl.$^5$ .......................... C12M 1/16; C12M 1/10
[52] U.S. Cl. ...................... 435/299; 435/312; 422/184; 422/209; 366/220; 366/228
[58] Field of Search ............... 435/303, 312, 313, 299, 435/316, 315; 71/9; 209/283, 284; 241/70, 71, DIG. 38; 366/25, 57, 220, 228; 422/184, 209; 384/15, 16, 144; 285/134, 281, 417, 165, 178; 277/53, 101, 173, 181, 182, 236

[56] References Cited

U.S. PATENT DOCUMENTS

| | | | |
|---|---|---|---|
| 721,890 | 3/1903 | Henius | 366/233 |
| 894,174 | 7/1908 | Smith | 366/233 |
| 2,198,737 | 4/1940 | Petersen | 366/220 |
| 2,241,734 | 5/1941 | Petersen | 71/9 |
| 2,823,106 | 2/1958 | Pierson | 71/9 |
| 2,864,672 | 12/1958 | Brooks, Sr. | 23/259.1 |
| 2,954,285 | 9/1960 | Carlsson et al. | 71/9 |
| 3,078,050 | 2/1963 | Hardinge | 241/70 |
| 3,138,447 | 6/1964 | Eweson | 71/9 |
| 3,178,267 | 4/1965 | Larson | 23/259.1 |
| 3,235,369 | 2/1966 | Eweson | 71/9 |
| 3,245,759 | 4/1966 | Eweson | 23/259.1 |
| 3,561,943 | 2/1971 | Gay, Jr. et al. | 71/9 |
| 3,676,074 | 7/1972 | Shibayama et al. | 23/259.1 |
| 3,930,799 | 1/1976 | Eweson | 23/259.1 |
| 3,989,499 | 11/1976 | Jetzer | 71/9 |
| 4,028,189 | 6/1977 | Fagerhaug et al. | 195/109 |
| 4,053,394 | 10/1977 | Fisk | 210/8 |
| 4,223,094 | 9/1980 | Vaseen | 435/312 |
| 4,244,656 | 1/1981 | Hohlbaum | 366/228 |
| 4,255,389 | 3/1981 | Jung et al. | 422/209 |
| 4,272,489 | 6/1981 | Lutz | 422/209 |
| 4,302,546 | 11/1981 | Schlichting, Jr. | 435/315 |
| 4,771,951 | 9/1988 | Kiehn | 241/DIG. 38 |

FOREIGN PATENT DOCUMENTS 2598705 11/1987 France .................. 435/312

Primary Examiner—Michael G. Wityshyn
Assistant Examiner—William H. Beisner
Attorney, Agent, or Firm—Michael, Best & Friedrich

[57] ABSTRACT

Method and apparatus for co-composting municipal refuse to reduce organic components in the refuse to useful soil additives. The apparatus includes a charger for receiving a quantity of refuse material and a labyrinth seal between the apparatus for charging and the inlet end of an elongated drum wherein the refuse material is held and mixed for decomposition. Sewage sludge is mixed with the refuse and the drum supports the mixture of refuse and sludge such that it decomposes while continuously and evenly moving from the inlet end of the drum to the discharge end of the drum. A cylindrical screen assembly is fixed to the discharge end of the drum for separation of the composted materials from other components of the refuse.

9 Claims, 3 Drawing Sheets

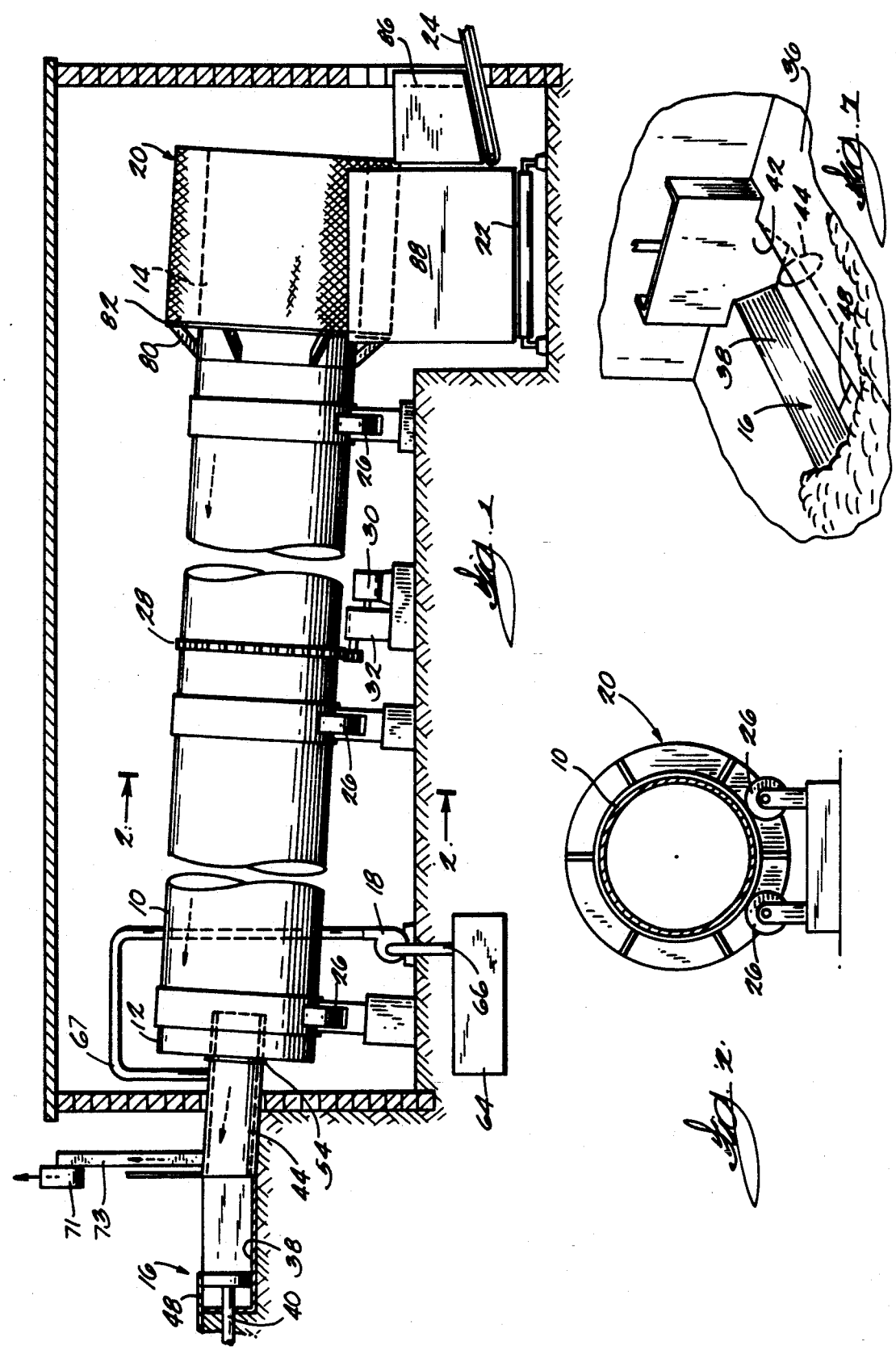

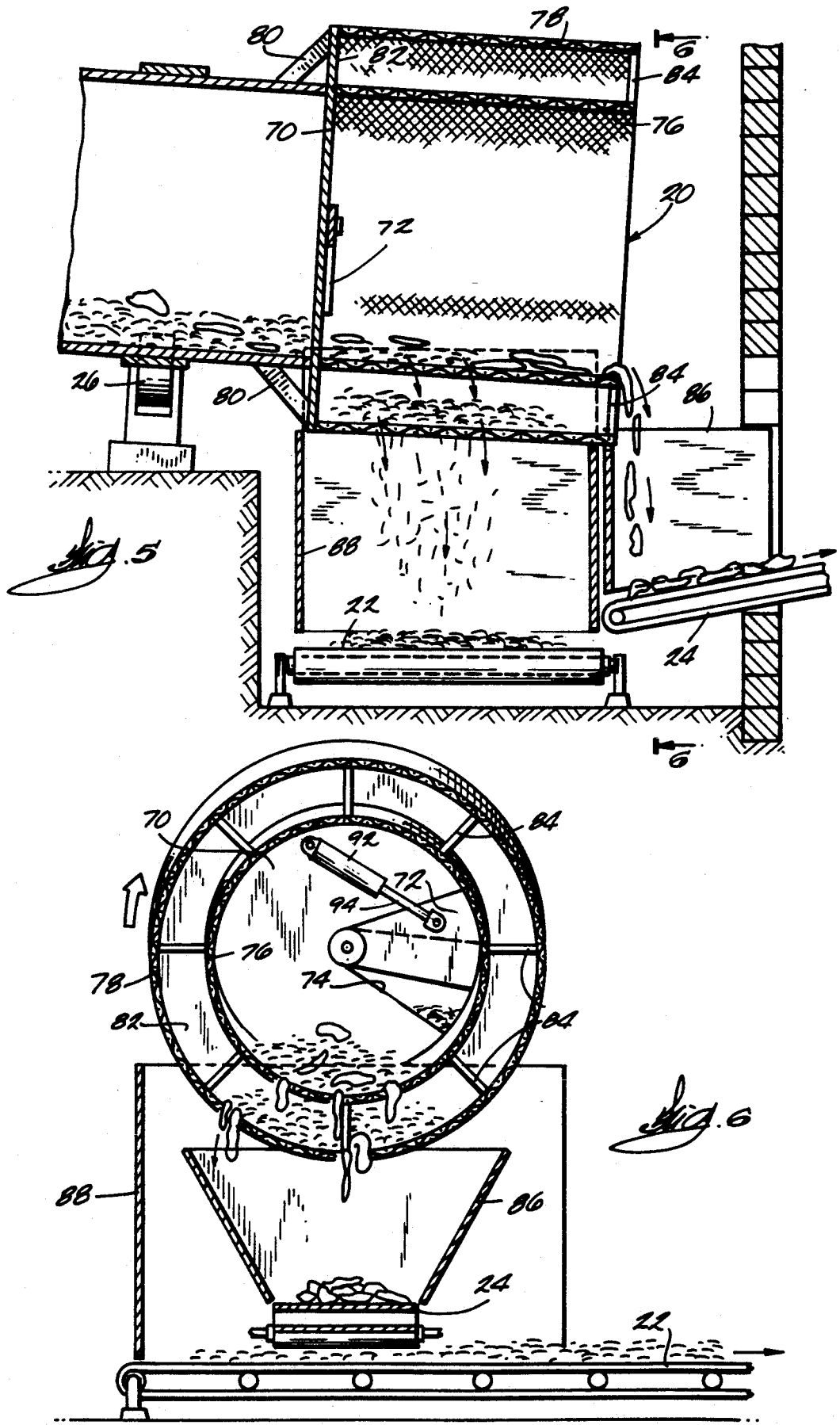

APPARATUS FOR CO-COMPOSTING MUNICIPAL REFUSE

FIELD OF THE INVENTION

The invention relates to methods and apparatus for disposal of municipal refuse, and more particularly, to a method and apparatus for co-composting municipal refuse to form a useful product comprising mulch, fertilizer or soil conditioner.

BACKGROUND PRIOR ART

Disposal of municipal refuse or garbage is an increasingly difficult problem for many municipalities. Municipal refuse is commonly disposed of in landfill sites, and such landfills require purchase of expensive land and are expensive to operate. Additionally, land used for landfills is unavailable for building or agriculture for an extended period of time during and after its use as a landfill.

Because of long felt problems associated with disposal of municipal refuse, there have been numerous efforts to develop means for composting municipal refuse to permit reuse of the soft organic components of the refuse as a fertilizer or soil additive. Examples of these prior art efforts are illustrated in the Eweson U.S. Pat. No. 3,138,447, issued Jun. 23, 1964; the Eweson U.S. Pat. No. 3,235,369, issued Feb. 15, 1966; the Eweson U.S. Pat. No. 3,245,759, issued Apr. 12, 1966; and the Eweson U.S. Pat. No. 3,930,799, issued Jan. 6, 1976.

Those apparatus include a rotating drum adapted to receive the municipal refuse and to promote biological decomposition of the refuse as it gradually moves from an inlet end of the drum, through a plurality of separate compartments, to an outlet end of the drum.

One of the disadvantages of the apparatus illustrated in the Eweson patents is that material such as fabric, plastic bags, cables and rope form obstructions in the apparatus preventing movement of the refuse from one compartment to the next and thereby prevent or restrict proper operation of the rotating drum.

Other prior art apparatus intended for use in composting refuse material or for use in converting garbage and municipal refuse to a useful product are illustrated in the Vaseen U.S. Pat. No. 4,223,094, issued Sep. 16, 1980; the Jung et al U.S. Pat. No. 4,255,389, issued Mar. 10, 1981; the Fisk U.S. Pat. No. 4,053,394, issued Oct. 11, 1977; the Jetzer U.S. Pat. No. 3,989,499, issued Nov. 2, 1976; the Pierson U.S. Pat. No. 2,823,106, issued Feb. 11, 1958; and the Brooks U.S. Pat. No. 2,864,672, issued Dec. 16, 1958. Attention is also directed to the Lutz et al. U.S. Pat. No. 4,272,489, issued Jun. 9, 1981; the Schlichting U.S. Pat. No. 4,302,546, issued Nov. 24, 1981; the Fagerhaug U.S. Pat. No. 4,028,189, issued Jun. 7, 1977: the Daigoro Shibayama U.S. Pat. No. 3,676,074, issued Jul. 11, 1972; the Larson U.S. Pat. No. 3,178,267, issued Apr. 13, 1965 the Gay U.S. Pat. No. 3,561,943, issued Feb. 9, 1971: the Carlsson U.S. Pat. No. 2,954,285, issued Sep. 27, 1960 and the Petersen U.S. Pat. No. 2,241,734, issued May 13, 1941. Attention is further directed to the publication titled "Revising an English Composting Plant" by Edward G. Hughes and describing a composting plant in Leicester, England.

SUMMARY OF THE INVENTION

The present invention provides an improved method and apparatus for use in co-composting municipal refuse to reduce organic components of the refuse to form a compost material useful as a soil additive and fertilizer having a nitrogen, potassium and phosphate content. The apparatus of the invention includes an improved means for charging refuse material into the apparatus to thereby cause biodegradation of the refuse material. The apparatus also includes an improved means for providing a seal between the apparatus for charging the refuse material into a rotating drum wherein the refuse is biologically processed. The method and apparatus embodying the invention also include an improved means for separating non-biodegradable components of the refuse material from the composted material to thereby facilitate use of the composted material as a soil additive. The apparatus embodying the invention also has a construction and operates in a manner which provides for uniform continuous flow of refuse material from the inlet end of the drum to the discharge end of the drum and provides for efficient biological decomposition of the refuse material in the drum.

Various other features and advantages of the invention will be apparent by reference to the following description of a preferred embodiment, from the drawings and from the claims.

BRIEF DESCRIPTION OF THE DRAWINGS

FIG. 1 is a perspective view of a refuse composting apparatus embodying the invention.

FIG. 2 is a cross section view taken along line 2—2 in FIG. 1.

FIG. 5 is an enlarged view of the discharge end of the drum illustrated in FIG. 1.

FIG. 6 is a cross section view taken along line 6—6 in FIG. 5.

FIG. 7 is a perspective view of a refuse receiving area and including apparatus illustrated in FIGS. 3 and 4.

Figure 3:
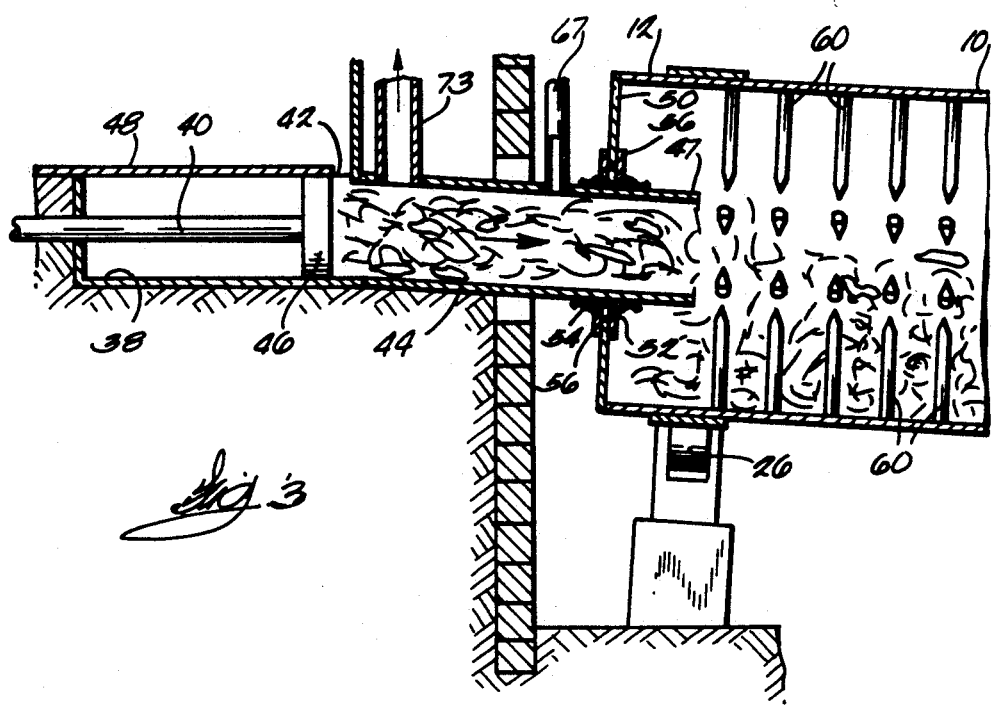
FIG. 3 is an enlarged view of the apparatus illustrated in FIG. 1 and for charging refuse material into the rotating drum.
Figure 4:
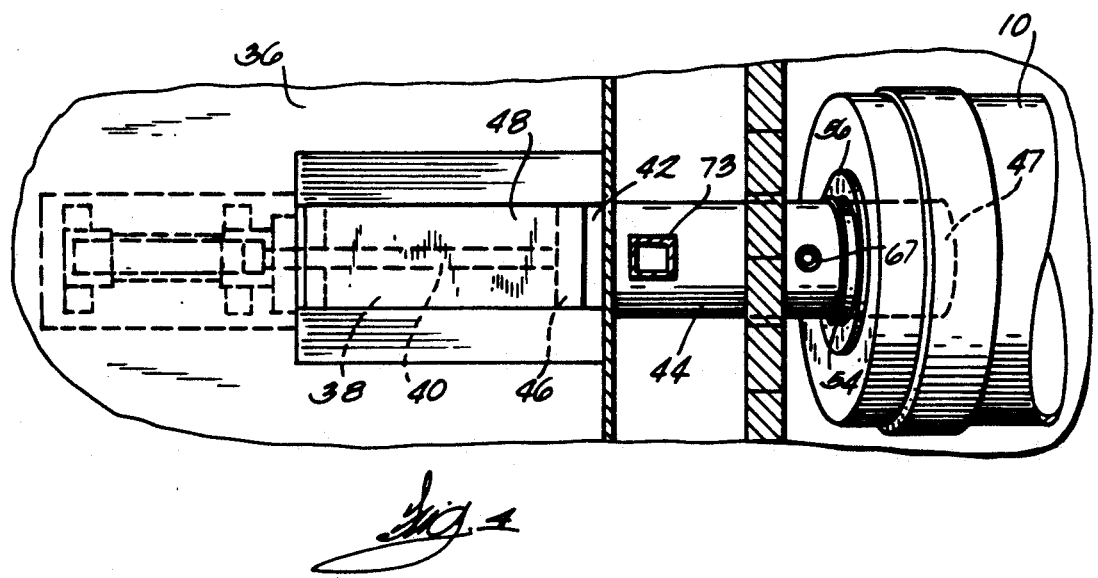
FIG. 4 is a plan view of the apparatus illustrated in FIG. 3.

Before describing a preferred embodiment of the invention in detail, it is to be understood that the invention is not limited to the details of construction and to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is an apparatus embodying the invention and for use in co-composting municipal refuse to produce a soil conditioner adapted to be mixed with soil and functioning as a mulch and fertilizer. The apparatus generally includes a large elongated drum 10 having one end 12 for receiving municipal refuse or garbage, and an opposite end 14 for discharging co-composted material including the soil conditioner. The drum 10 is supported such that it can be rotated slowly about its central longitudinal axis to provide for continuous mixing of the refuse material in the drum. A charging apparatus 16 is provided at one end of the drum for receiving a quantity of garbage from collection trucks and for forcing that garbage into the inlet end 12 of the drum. Pump means 18 are also provided at the upper end of the drum for introducing moisture into the drum. In a preferred form of the invention, the pump means 18 supplies sewage sludge to the drum to provide moisture to the garbage in the drum. The garbage is rotated in the drum for an extended period of time, which may be from two weeks to two months, and is discharged from the lower or opposite end 14 of the drum 10. During the time period that the refuse material is held in the drum, it is shredded by the mixing action of the rotating drum and is caused to decompose because of bacterial action occurring in the drum. Means are provided at the discharge end 14 of the drum for screening the composted refuse material and for separating large materials from the composted organic material. In the illustrated arrangement this means for separating comprises a screen assembly 20 for separating composted organic material from the larger materials such as metal products, plastic sheet and bottles, heavy fabrics and leather materials. A conveyor 22 is provided for transferring the composted organic material to a storage area, and a second conveyor 24 is positioned to receive the larger materials separated by the screen assembly for conveying those materials to a second storage area.

While the elongated drum 10 can be constructed in other ways, in one form of the invention the elongated drum can comprise a cylindrical steel drum having an internal diameter of approximately 11 feet and having a length of 165 feet. The drum is supported such that the inlet end 12 of the drum is elevated with respect to the discharge end 14 of the drum at approximately a 3% grade. In the illustrated arrangement the means for supporting the drum comprises pairs of rollers 26 spaced apart along the length of the drum and positioned beneath the drum to support it. The rollers 26 are in turn supported by bearings so as to be freely rotatable about their axes.

Means are also provided for causing continuous rotation of the drum. In the illustrated arrangement, this means includes a ring gear 28 fixed to the periphery of a central portion of the drum 10 and a drive motor 30 operable to drive the drum through reduction gears housed in a gear box 32. It has been found that the composting process in the drum is facilitated if the drum is caused to rotate at a rate of approximately ½ to 1 revolution per minute.

While the drum 10 and the means for rotatably driving the drum could have other constructions, in the illustrated arrangement, this structure is the same as that conventionally used as a concrete kiln, and in a preferred form of the invention the apparatus embodying the invention can be economically assembled by use of obsolete concrete kiln components.

Illustrated more particularly in FIG. 3 is the charging apparatus for receiving a quantity of garbage or municipal refuse and for feeding that material into the inlet end 12 of the drum 10. In the illustrated arrangement, a storage area or building is provided for receiving the municipal refuse. The receiving area includes a floor 36 including a pit or chamber 38, the pit 38 being open at the top and housing a reciprocating hydraulic ram 40. A discharge end 42 of the pit 38 is connected to one end of a pipe or tube 44 having an opposite end 46 extending into the inlet end 12 of the drum 10. The ram 40 includes a piston 46 having a periphery substantially the same size as the interior of the pit 38, and the piston 46 being adapted to engage the refuse material in the pit 38 for forcing it from the pit into the tube 44. Also included is a horizontal cover plate 48 having a forward end joined to the upper edge of the piston 46, the horizontal cover plate 48 being adapted to function as a sliding cover for the pit 38 when the ram 40 is in its extended position and preventing garbage from falling into the pit during the forward stroke of the ram.

In operation of the means for supplying refuse material to the inlet end 12 of the drum, when the ram 40 is in the retracted position, unprocessed refuse material on the floor 36 of the refuse receiving area can be pushed into the open pit with an end loader or other loading machinery. The operator then actuates the hydraulic ram 40 to cause the refuse material to be forced into the tube 44. The ram 40 is retracted and another charge of refuse material is pushed into the pit 38.

In a preferred form of the invention, the pipe 44 supplying refuse material to the inlet end of the drum 10 will have a central longitudinal axis coextensive with the longitudinal axis of rotation of the drum, and the pipe 44 is inclined at the same angle of inclination as the drum. Additionally, in a preferred form of the invention, the floor 36 of the refuse receiving area will be elevated with respect to the inlet end of the drum 10 and such that the floor of the pit 38 will be generally aligned with the bottom of the upper end of the pipe 44 supplying refuse material to the drum 10.

Means are also provided for forming a sealing connection between the discharge end 47 of the pipe 44 and the inlet end 12 of the drum. In the illustrated arrangement, the drum 10 includes an end wall 50 having a central circular opening 52 housing the discharge end 47 of the pipe 44, and having a diameter slightly larger than the outside diameter of the pipe. A cylindrical collar or sleeve 54 surrounds the discharge end 47 of the pipe 44 and is supported thereon for slideable movement along the pipe 44 in the direction of the longitudinal axis of the pipe. A pair of circular flanges 56 surround the cylindrical collar 54 and project outwardly from the collar 54 so as to define planes parallel to the end wall 50, one of the flanges 56 being positioned on one side of the end wall 50 of the drum and another of the flanges 56 being positioned on the other side of the end wall 50 of the drum. The flanges 56 are spaced apart in the direction of the longitudinal axis of the pipe 44 but are positioned sufficiently closely adjacent to one another and to the end wall 50 as to provide for rotation of the drum 10 with respect to the pipe 44 but to prevent discharge of refuse material between the end wall 50 of the drum and the pipe 44 by providing a labyrinth seal in combination with the end wall of the drum. While the cylindrical collar 54 could have other constructions, in the illustrated arrangement, it is comprised of corrugated metal having a plurality of spaced circumferentially oriented ribs slideably supported on the pipe 44. Use of corrugated metal to form the cylindrical collar provides for a relatively small surface area of contact between the outside surface of the pipe 44 and the interior surface of the collar 54 and thereby facilitates sliding movement of the collar 54 on the pipe 44 in the direction of the longitudinal axis of the drum. The provision of the pair of flanges 56 positioned on the opposite sides of the end wall 50 provides an effective labyrinth sealing device for preventing garbage from escaping from the drum between the outside of the pipe 44 and the circular opening 52 in the end wall 50 of the drum.

In one preferred form of the invention, means are also provided on the interior of the drum for breaking up the refuse material into small pieces during rotation of the drum. In the illustrated arrangement, this means for breaking up the refuse includes a plurality of elongated spikes 60 projecting radially inwardly from the inner wall of the drum, the spikes 60 being provided on approximately one quarter of the length of the drum. In operation of the apparatus, as the drum rotates, large pieces in the refuse material will be carried upwardly by the spikes 60 and will then fall onto the spikes 60 at the bottom of the drum. For example, plastic garbage bags in the refuse material will be torn apart by the spikes 60 to facilitate further tearing and decomposition of the material in the garbage bags.

Means are also provided for supplying moisture to the refuse material contained in the upper end 12 of the drum 10 to increase the moisture content of that material so as to maximize bacterial decomposition of the refuse material. While in some applications such moisture can be added by injecting water into the refuse, in the illustrated arrangement means are provided for supplying activated sewage sludge to the material contained in the inlet end 12 of the drum 10, the sewage sludge being bacteriologically treated sludge from a municipal waste water treatment plant. The sludge added to the refuse contains approximately 3–5% solids and the remainder water. The sewage sludge also contains bacterial organisms which aid in the biological decomposition of the refuse when the refuse and sludge are continually mixed in the drum.

It has been found that decomposition of the refuse is enhanced if sufficient sludge is added to the refuse material to increase the moisture content of the combined product to approximately 50% by weight. Because the amount of water in the refuse material supplied to the drum may vary depending on weather conditions and the type of refuse material being supplied to the drum, the amount of sewage sludge added can be varied by the operator as required.

While various means could be provided for adding sewage sludge to the refuse material, in the illustrated arrangement, a tank 64 is provided for containing a quantity of sewage sludge. A pipe 66 extends from the tank 64 to the pump 18, and the pump 18 forces the sludge through a pipe 67 into an upper portion of the pipe 44 closely adjacent the inlet end of the drum.

The sewage sludge and refuse materials supplied to the drum are continually mixed in the drum due to the rotation of the drum, and the refuse material and sludge gradually move along the length of the drum from the inlet end of the drum to the discharge end.

Means are also provided for drawing air through the drum 10 to facilitate biological decomposition of the material in the drum. In the illustrated construction a fan 71 is connected to the pipe 44 through an air discharge duct 73. The fan 71 functions to draw air from the lower end 14 of the drum 10, along the length of the drum and then pull the air through the pipe 44 and duct 73 to be discharged to the atmosphere.

Means are also provided at the discharge end of the drum for separating the composted organic refuse material now comprising small particles from the large pieces of material remaining in the refuse and not biologically broken down during the composting operation. During the processing of the refuse, materials such as aluminum, steel cans, plastic bags, rope and cords, are not broken down and decomposed. Accordingly, means must be provided at the discharge end for separating this material from the co-composted refuse material. In the illustrated construction, a separation means is provided by the cylindrical screen assembly 20 fixed to the discharge end of the drum and adapted to rotate with the drum. As illustrated in FIGS. 5 and 6, the drum includes an end wall 70 having a slideably movable door 72. While the door 72 could have other constructions, in the illustrated arrangement the door 72 forms a segment of the drum end wall 70 and can be opened to form a segment shaped opening 74 extending radially outwardly from the center of the end wall 70 to its periphery. When the door 72 is open, as the drum 10 rotates to a position where the opening 74 is at the bottom of the drum, the refuse material will be discharged onto the screen assembly 20.

The door 72 is operated with a two stage acting hydraulic cylinder 92 and ram 94 mounted on the end wall 70. A hydraulic pump (not shown) operates the hydraulic cylinder 92 which is covered with a metal shield (not shown) to protect from the refuse material being discharged onto the screen assembly 20.

The cylindrical screen assembly 20 includes an inner cylindrical screen 76 having a large open mesh, and an outer cylindrical screen 78 having a diameter substantially the same as the outside diameter of the drum 10, the larger concentric screen 78 having a mesh somewhat smaller than the mesh of the inner cylindrical screen 76. A frame structure, including a plurality of braces 80 and a circular flange 82 surrounding the end 14 of the drum, provides a means for rigidly supporting the concentric cylindrical screens 76 and 78 on the end of the drum for rotation with the drum. A plurality of braces 84 are provided at the opposite ends of the screens 76 and 78 to maintain those ends of the screens in concentric spaced apart relation.

The conveyor belt 24 has one end positioned beneath the first and second concentric screens 76 and 78 such that refuse material caught by these screens will fall onto the first conveyor belt 24. The second conveyor belt 22 is positioned beneath the screens 76 and 78 so as to receive composted refuse material discharged from the drum and falling through the screens. In the illustrated arrangement, a first bin 86 is positioned beneath the discharge ends of the screens 76 and 78 to guide refuse material from the screens onto the conveyor 24. A second bin 88 is positioned beneath the screen 78 to channel the composted material passing through the screen 78 onto the conveyor 22. In the illustrated arrangement the inner screen 76 has a mesh of approximately 2 inches and the outer concentric screen 78 has a mesh of approximately ⅜ inches.

In operation of the screen assembly, material discharged through the opening 74 in the end wall 70 of the drum 10 will fall onto the inner screen 76. As the drum 10 and the screen 76 rotate, the small particulate refuse material will fall through the screen 76 while material such as plastic garbage bags, metal cans and other larger components of the refuse material not broken down during the decomposition process will be deposited onto the conveyor belt. Similarly, as the smaller particle refuse material passes through the inner screen 76, it will fall onto the outer concentric screen 78. As the drum 10 and the screen assembly 20 continues to rotate, the fine particulate material will pass through the screen 78 onto the conveyor 22 while particles larger than ⅜ inches will be arrested by the screen 78 and deposited onto the conveyor 24. Continuous rotation of the drum will cause mixing of the material on both the inner and outer screens to insure separation of the small particles from those particles arrested by the screens.

Various features of the invention are set forth in the following claims.

We claim:

1. Apparatus for composting municipal refuse to cause biological decomposition of organic material in the municipal refuse, the apparatus comprising an elongated drum adapted to contain municipal refuse, the drum having an inlet end and a discharge end and including a central longitudinal axis, means for supporting the drum for rotation about its central longitudinal axis and with the inlet end of the drum higher than the discharge end of the drum, means for causing rotation of the drum about the longitudinal axis, means for supplying refuse material to the inlet end of the drum, the means for supplying refuse material to the inlet end of the drum including a chamber for containing a charge of refuse material, a pipe for connecting the chamber to the inlet end of the drum, the pipe having opposite ends, one end of the pipe being connected to the chamber and an opposite end of the pipe extending into and beyond the inlet end of the drum, and means for selectively forcing refuse material into the one end of the pipe, and means for connecting the opposite end of the pipe to the drum to facilitate rotation of the drum with respect to the pipe and for preventing discharge of refuse material between the inlet end of the drum and the pipe, the means for connecting the pipe to the drum including a cylindrical collar surrounding the pipe and supported on the pipe for slideable movement on the pipe in the direction of the longitudinal axis of the drum.

2. Apparatus as set forth in claim 1 and further including means for supplying a quantity of moisture to the inlet end of the drum.

3. Apparatus as set forth in claim 2 wherein the means for supplying moisture to the inlet end of the drum includes a means for supplying sewage sludge to the inlet end of the drum, the means for supplying sewage sludge including a pump connected to a source of sewage sludge and a conduit between the pump and the pipe for supplying refuse to the inlet end of the drum.

4. Apparatus as set forth in claim 1 wherein the composted refuse material at the discharge end of the drum includes large particle component materials and composted particulate material, the composted particulate material having particle sizes smaller than the large particle component materials, and further including means for separating the composted particulate material from the larger materials in the refuse discharged from the discharge end of the drum.

5. Apparatus as set forth in claim 4 wherein the means for separating includes a first screen surrounding the discharge end of the drum, the first screen receiving composted particulate material discharged from the discharge end of the drum.

6. Apparatus as set forth in claim 5 wherein the first screen comprises a cylindrical screen fixed to the drum and having a longitudinal axis coextensive with the axis of the drum and for rotation with the drum.

7. Apparatus as set forth in claim 6 and further including a conveyor positioned below an end portion of the cylindrical screen for receiving large component materials from the cylindrical screen and a second conveyor is positioned below the cylindrical screen for receiving small particulate material.

8. Apparatus as set forth in claim 7 and further including a second cylindrical screen surrounding the first cylindrical screen.

9. Apparatus for composting municipal refuse to cause biological decomposition of organic material in the municipal refuse, the apparatus comprising:

an elongated drum defining a single composting chamber extending substantially the length of the drum and adapted to contain municipal refuse, the drum having an inlet end and a discharge end and including a central longitudinal axis, means for supporting the drum for rotation about its central longitudinal axis and with the inlet end of the drum higher than the discharge end of the drum, means for causing rotation of the drum about the longitudinal axis, means for supplying a quantity of moisture to the inlet end of the drum, including means for supplying sewage sludge to the inlet end of the drum, the means for supplying sewage sludge including a pump connected to a source of sewage sludge and a conduit between the pump and the inlet end of the drum, a plurality of spaced-apart elongated members fixed to the drum and projecting generally radially inwardly, and means for supplying refuse material to the inlet end of the drum, the means for supplying refuse material to the inlet end of the drum including a storage area for receiving refuse material, the storage area including a floor, a chamber for containing a charge of refuse material, the chamber being in the floor such that refuse material on the floor can be pushed into the chamber, a pipe for connecting the chamber to the inlet end of the drum, the pipe having opposite ends, one end of the pipe being connected to the chamber and an opposite end of the pipe extending into the inlet end of the drum, and means for selectively forcing refuse material into the one end of the pipe, the means for selectively forcing including a ram housed in the chamber and extensible to force refuse material into the pipe, and further including means for connecting the opposite end of the pipe to the drum to facilitate rotation of the drum around the pipe, the means for connecting the pipe to the drum including means for preventing discharge of refuse material between the inlet end of the drum and the pipe, wherein the means for connecting the pipe to the drum includes a cylindrical collar surrounding the pipe and supported on the pipe for slideable movement on the pipe in the direction of the longitudinal axis of the drum, wherein the inlet end of the drum has an end wall including a central opening, the pipe and the collar being housed in the central opening, and wherein the means for connecting the pipe to the drum includes a pair of flanges supported by the collar, the flanges lying in planes generally perpendicular to the longitudinal axis of the drum, one of the flanges being positioned on one side of the end wall of the drum and the other of the flanges positioned on the opposite side of the end wall of the drum.

* * * * *